United States Patent [19]
Bretschneider et al.

[11] 3,818,027
[45] June 18, 1974

[54] PROCESSES AND INTERMEDIATES FOR SULFONYLUREA DERIVATIVES

[75] Inventors: Hermann Bretschneider; Klaus Grassmayr; Kraft Hohenlohe-Oehringen, all of Innsbruck, Austria; Andre Grussner, Basel, Switzerland

[73] Assignee: Hoffmann-LaRoche Inc., Nutley, N.J.

[22] Filed: Oct. 29, 1971

[21] Appl. No.: 194,055

Related U.S. Application Data

[62] Division of Ser. No. 818,141, April 21, 1969, Pat. No. 3,654,357.

[30] Foreign Application Priority Data
Apr. 26, 1968 Switzerland.......................... 6285/68

[52] U.S. Cl......... 260/307 D, 260/293.58, 424/267, 424/274, 424/321, 424/322
[51] Int. Cl............................................ C07d 85/48
[58] Field of Search.................. 260/307 D, 293, 58

[56] References Cited
UNITED STATES PATENTS
3,654,357    4/1972    Bretschneider et al. ........ 260/552 R Primary Examiner—Nicholas S. Rizzo
Assistant Examiner—R. V. Rush
Attorney, Agent, or Firm—Samuel L. Welt; Jon S. Saxe; William G. Isgro

[57] ABSTRACT

Intermediates of the formula

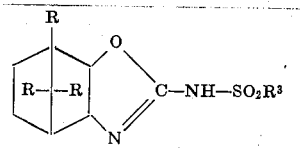

wherein R and $R^3$ are as herein after set forth, useful for preparing bicyclic sulfonylurea derivatives, are described. The bicyclic sulfonylurea end products are useful as hypoglycemic agents.

4 Claims, No Drawings

PROCESSES AND INTERMEDIATES FOR SULFONYLUREA DERIVATIVES

This application is a division of U.S. Pat. Application Ser. No. 818,141, filed Apr. 21, 1969, now U.S. Pat. No. 3,654,357, issued Apr. 4, 1972.

BRIEF SUMMARY OF THE INVENTION

The invention relates to processes for preparing hypoglycemic compounds of the formula

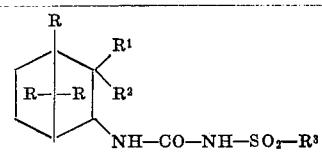

I wherein R is hydrogen or methyl, $R^1$ is hydrogen, $R^2$ is hydroxy or $R^1$ and $R^2$, taken together, are the oxygen atom of a keto group (which can also be present as a ketal), $R^3$ is selected from the group consisting of phenyl; phenyl substituted by halogen, lower alkyl, lower alkoxy, lower alkylthio, amino, acetyl, acylamino or diacylimido; benzamidoethylphenyl substituted by one or more substituents selected from the group consisting of lower alkoxy and halogen; and a 6- or 6-membered, N-bonded, nitrogen-containing heterocyclic ring, and salts thereof with pharmaceutically acceptable bases. The end products are useful hypoglycemic agents.

In another aspect, the invention relates to novel intermediates.

DETAILED DESCRIPTION OF THE INVENTION

The invention relates to processes for preparing hypoglycemic compounds of the formula

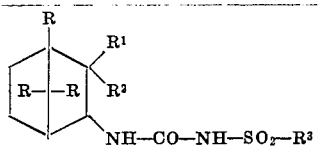

I wherein R is hydrogen or methyl, $R^1$ is hydrogen; $R^2$ is hydroxy or $R^1$ and $R^2$, taken together, are the oxygen atom of a keto group (which can also be present as a ketal), $R^3$ is selected from the group consisting of phenyl; phenyl substituted by halogen, lower alkyl, lower alkoxy, lower alkylthio, amino, acetyl, acylamino or diacylimido; benzamidoethyl-phenyl substituted by one or more substituents selected from the group consisting of lower alkoxy and halogen; and a 5- or 6-membered, N-bonded, nitrogen-containing heterocyclic ring, a and salts thereof with pharmaceutically acceptable bases.

More particularly, a process in accordance with the invention comprises exchanging the sulfur atom of the thiourea grouping of a compound of the formula

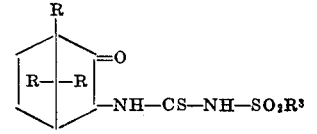

II wherein R and $R^3$ are as previously described and the ring-located keto group can also be ketalized, for an oxygen atom [Process (a)].

Another process comprises exchanging the imino group of the guanidino grouping of a compound of the formula

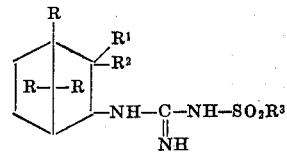

III wherein R, $R^1$, $R^2$ and $R^3$ are as previously described, for an oxygen atom [Process (b)].

Still another process comprises hydrolyzing a compound of the formula

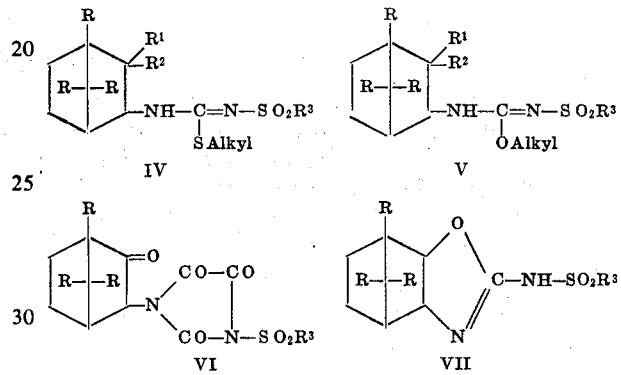

or

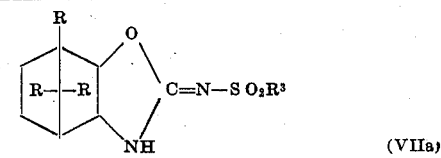

(VIIa)

wherein R, $R^1$, $R^2$ and $R^3$ are as previously described and the ring-located keto group of the compound of formula VI can also be ketalized [Process (c)].

A further process comprises submitting to a Friedel-Crafts reaction a compound of the formula

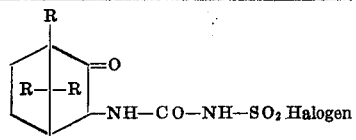

XIII wherein R is as previously described and the ring-located keto group can also be ketalized, with a compound of the formula $R^3H$ wherein $R^3$ is as previously defined [Process (d)].

A further process comprises reacting a compound of the formula

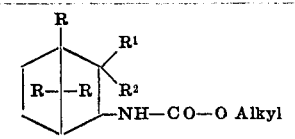

VIII wherein R, $R^1$ and $R^2$ are as previously described, with an alkali salt of a sulfonamide of the formula $R^2SO_2NH_2$ wherein $R^3$ is as previously described [Process (e)].

If desired, a ring-located keto group in the reaction product is reduced and, if desired, isomers obtained thereby are separated; a hydroxy group in the reaction product, if desired, can be oxidized and a ketal obtained can be saponified, if desired.

As used herein, the term "lower alkyl" denotes a straight chain or branched chain alkyl group containing 1–7 carbon atoms, e.g., methyl, ethyl, propyl, isopropyl, butyl, pentyl, hexyl and the like. The term "lower alkoxy" denotes lower alkyl ether groups in which the lower alkyl moiety is as defined above. The term "halogen" denotes bromine, iodine and chlorine; chlorine is preferred. A halophenyl is preferably chlorophenyl. The term "acylamino" denotes an aliphatic or aromatic acyl residue such as acetamino, benzoylamino and the like. The term "diacylimido" denotes, for example, phthalimido. A preferred substituted benzamidoethylphenyl is alkoxy- and/or halo-benzamidoethylphenyl, most preferred is the β-(2-methoxy-5-chlorobenzamido)-ethylphenyl residue. The term "alkylene" as used herein denotes an alkylene group of 2–7 carbon atoms, for example, propylene, butylene and the like. Examples of 5- or 6-membered, N-bonded, nitrogen-containing heterocyclic rings are piperidino and pyrrolidino.

Compounds of this invention corresponding to formula I are exemplified by the following:

1-(p-toluenesulfonyl)-3-(2-endo-hydroxy-3-endobornyl)-urea;
1-(-P-toluenesulfonyl)-3-(3-endo-D-camphoryl)-urea;
1-(p-chlorobenzenesulfonyl)-3-(3-endo   -endo-D-camphoryl)-urea;
1-(p-methylthiobenzenesulfonyl)-3-(3-endo-D-camphoryl)-urea;
1-(p-toluenesulfonyl)-3-(2-exo-hydroxy-3-endobornyl)-urea;
1-(p-toluenesulfonyl)-3-(3-endo-norcamphoryl)-urea;
1-(p-toluenesulfonyl)-3-(2-endo-hydroxy-3-endo-norbornyl)-urea;
1-(1-piperidinosulfonyl)-3-(3-endo-D-camphoryl)-urea;
1-{ 4-[β-(2-methoxy-5-chloro-benzamido)ethyl]-benzenesulfonamido }-3-(3-endo-D-camphoryl)-urea;

and salts thereof with pharmaceutically acceptable bases.

As ketals, there come into consideration, for example, dialkyl ketals such as the dimethyl or diethyl ketals, and alkylene ketals such as ethylene ketal. The saponification of such ketals can be carried out with acidic agents, for example, mineral acids such as hydrochloric acid and preferably in the presence of an organic solvent, such as acetone. A ring-located keto group which may be present in the obtained reaction product can subsequently be reduced to the hydroxyl group in a known manner, for example, by treatment with a complex metal hydride, such as sodium borohydride, or by catalytic hydrogenation. Cis-trans isomers obtained in the reduction can, if desired, be separated according to known methods, for example, by crystallization or by chromatography. On the other hand, a hydroxy group in the reaction product can be oxidized to the keto group in a known manner, for example, by means of chromic acid.

The compounds of formula I can exist in various configurations depending on the stereochemistry of the starting materials of formulas II to VIII and XIII, for example as the racemate or as the optically active form. Preferred starting compounds of formulas II to VIII and XIII, are those in which R is a methyl group, and of these especially preferred are those derived configuratively from DL- or D-camphor, borneol or isoborneol.

The exchange of the sulfur atom of the thiourea grouping for an oxygen atom in accordance with Process (a) can be effected in a known manner, for example, by treatment of a compound of formula II with a heavy metal salt or oxide such as lead, mercury or silver salt or oxide or with a mild oxidizing agent such as $H_2O_2$, $HNO_2$ or the like.

The starting compounds of formula II can, for example, be prepared by reacting 3-aminocamphor or 3-amino-nor-camphor, or a ketal thereof, with an isothiocyanate of the formula $R^3SO_2NCS$. On the other hand, 3-aminocamphor or 3-amino-norcamphor or a ketal thereof, can be converted by reaction with thiophosgene to the isothiocyanate and the latter is reacted with an alkali salt of a sulfonamide of the formula $R^3SO_2NH_2$ to give a compound of formula II. Those starting compounds of formula II are conveniently used in which no substituents (such as thioether and free amino groups) unstable to the desulfurizing agents are present.

The exchange of the imino group of the guanidino grouping in a compound of formula III for an oxygen atom in accordance with Process (b) may, for example, be carried out by treatment with nitrous acid or acidic hydrolysis, for example, by means of mineral acids, such as hydrochloric acid.

The starting compounds of formula III can be prepared by reacting 3-amino-camphor, 3-amino-norcamphor, 3-aminoborneol or 3-amino-norborneol with cyanamide and reacting the guanidino derivative thus obtained with a sulfonamide of the formula $R^3SO_2NH_2$.

The hydrolysis of compounds of formulas IV, VI and VII (Process c) is conveniently carried out by means of alkaline agents such as alkali hydroxides or carbonates, for example, with caustic soda. Compounds of formula V are conveniently hydrolyzed acidically, for example, by means of mineral acids such as dilute hydrochloric acid.

Process (c) is conveniently only used when the desired endproduct of formula I is to contain no hydrolyzable groups such as acylamino or diacylamido groups.

Starting compounds of formula IV can, for example, be obtained by reacting a salt of a sulfonamide of the formula $R^3SO_2NH_2$, for example, the Na salt, with an alkali hydroxide and carbon disulfide to give a compound of the formula

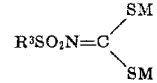

IX wherein M is the cation of an alkali metal, and converting the compound of formula IX by alkylation, for example, methylation, by means of dimethyl sulfate to the corresponding di-thioalkyl ether, which in turn, with 3-amino-camphor, 3-amino-nor-camphor or their ketals, 3-aminoborneol or 3-amino-nor-borneol, yields the isothiourea alkyl ether. Compounds of formula IV with $R^1$ is hydrogen and $R^2$ is hydroxy are conveniently prepared from the corresponding ketones by reduction, for example, with sodium borohydride. The isothiocyanate of the formula $R^3SO_2NCS$ mentioned under Process (a) can also be obtained from the dimethyl ether of a compound of formula IX by treatment with phosgene.

The starting compounds of formula V can be obtained from camphor, norcamphor or a ketal thereof by reaction with an n-p-tosyl-dialkoxy-(especially diethoxy)carbonylimide to give a compound of the formula

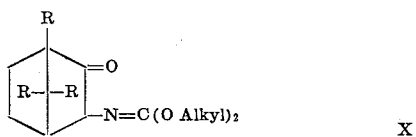
           X or a ketal thereof and subsequently reacting the compound of formula X with an alkali salt of a sulfonamide of the formula $R^3SO_2NH_2$.

A compound of formula V is conveniently prepared by reacting a compound of the formula

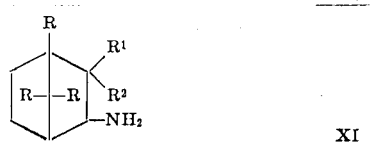
           XI with a compound of the formula

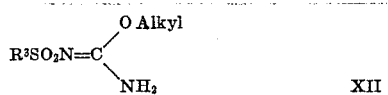
           XII and hydrolyzing in situ.

The reaction of a compound of formula XI with an N-sulfonyl-O-alkylisourea of formula XII is conveniently effected by heating the reactants in an aprotic solvent such as dimethylformamide. The compound of formula XI preferably is employed in the form of the hydrochloride.

Starting compounds of formula XI can, for example, be obtained by converting a corresponding ketone into the isonitroso ketone, for example, by treatment with amyl nitrite, and reducing the reaction product to the amino ketone, for example, by means of zinc in caustic soda. The amino ketone thus obtained can, if desired, be ketalized or reduced to the amino alcohol. The ketalization can be undertaken in a knwon manner, for example, by treating the amino ketone with the corresponding alcohol in the presence of anhydrous acids such as p-toluene-sulfonic acid. The reduction of the amino ketone to the amino alcohol can, for example, be effected with sodium borohydride or by catalytic hydrogenation.

The N-sulfonyl-O-alkylisourea of formula XII can be prepared from the corresponding sulfonic acid chloride and the corresponding O-alkylisourea in the presence of acid-binding agents, such as alkali carbonate.

For the preparatin of a starting compound of formula VI, for example, 2-ureido-camphor, 2-ureido-norcamphor, or a ketal thereof is reacted with a reactive oxalic acid derivative such as oxalyl chloride. On the other hand, one can also proceed to a compound of formula VI by reacting a parabanic acid with 3-bromocamphor or 3-bromo-nor-camphor.

The starting compounds of formula VII or VIIa can be prepared as follows:

3-aminoborneol or 3-amino-nor-borneol is cyclized with phosgene to a bornano- or norbornano-oxazolidinone which is reacted with a phosphorane of the formula $R^3SO_2NP(C_6H_5)_3$. Further, a compound of formula IV in which $R^1$ is hydrogen and $R^2$ is hydroxy may be cyclized to a compound of formula VII by pyrolysis. This cyclization can also be effected in the course of preparing a compound of formula IV from a dithioalkyl ether of a compound of formula XI and 3-aminoborneol or 3-amino-nor-borneol.

The Friedel-Crafts reaction in accordance with process variant (d) can be brought about in a manner known per se, e.g., by heating the starting materials in the presence of a Friedel-Crafts catalyst, such as $AlCl_3$, $ZnCl_2$, $BF_3$, $SnCl_4$ etc., if desired, in the presence of a suitable solvent, such as petroleum ether, $CS_2$ or dioxane.

Compounds of formula XIII can be prepared by reacting 3-amino-camphor or 3-amino-nor-camphor or a ketal thereof with a halogen-(in particular chloro-)sulfonyl isocyanate.

The reaction compounds of formula VIII in accordance with process variant (e) can be undertaken by heating the reactants in an aprotic solvent such as dimethylformamide or pyridine.

Compounds of formula VIII can, for example, be prepared by reacting 3-aminocamphor or 3-amino-nor-camphor with a chloroformic acid alkyl ester.

The compounds of formulas II-VIII and XIII are useful as intermediates for the preparation of the useful compounds of formula I.

The compounds of formula I are distinguished by blood sugar depressant activity on oral administration. Thus, the compounds of formula I are useful as hypoglycemic agents or as antidiabetic agents. Their useful hypoglycemic properties are manifested upon administration to warm-blooded animals. For example, when 1-(2-endo-hydroxy-3-endo-bornyl)-3-(p-tolylsulfonyl)-urea which has an $LD_{50}$ of 5,000 mg/kg p.o. in rats is administered to dogs in doses in the range of 0.35 to 3.0 mg/kg., it causes a marked lowering of blood sugar levels over a 24-hour period as compared to controls. Furthermore, the compounds of formula I have effects qualitatively similar in many respects to those of 1-butyl-3-sulfanilylurea, well known for its therapeutic uses and properties. Thus, the compounds of this invention demonstrate a pattern of activity associated with hypoglycemic agents of known efficacy and safety.

The compounds of formula I can be used as medicaments in the form of tablets, capsules or dragees. Suitable dosage units contain from about 10 to 250 mg. Suitable dosage regimens in warm-blooded mammals are from about 0.15 mg/kg per day to about 7.0 mg/kg per day, but for any particular subject, the specific dosage regimen should be adjusted according to individual need and professional judgment of the person administering or supervising the administration of the compound of formula I.

the orally administerable pharmaceutical preparations can contain in admixture with the compounds of formula I, organic or inorganic carrier materials, such as, for example, lactose, starch, talc, magnesium stearate, and the like. They can also certain other active ingredients, including other hypoglycemic agents.

The compounds of formula I are further described in copending U.S. Patent Application Ser. No. 675,796, filed Oct. 17, 1967, now abandoned.

The following examples further illustrate the invention. All temperatures are in degrees Centigrade, unless otherwise mentioned.

EXAMPLE 1

Preparation of 1-(p-toluenesulfonyl)-3-(3-endo-D-camphoryl)-urea 4.8 g. of 1-(p-toluenesulfonyl)-3-(3-endo-D-camphoryl)-thiourea are dissolved in 30 ml. of acetone. The solution is cooled to 5° and treated with 1.1 g. of sodium nitrite in 5 ml. of water and, with stirring, dropwise with 8.3 ml. of 5-N acetic acid. The resulting solution is stirred at 5° for 2 hours. The acetone is then distilled off under vacuum. The residue is suspended in 50 ml. of water, removed by filtration, washed with water, dissolved in hot methanol, treated with charcoal, filtered, crystallized by the addition of water and recrystallized from alcohol to yield 1-(p-toluenesulfonyl)-3-(3-endo-D-camphoryl)-urea having a melting point of 192°–194°.

The thiourea derivative can be prepared as follows:

7.8 ml. of thiophosgene in 30 ml. of chloroform are added dropwise at 10°–15° with stirring to a suspension containing 12 g. of 3-endo-amino-D-camphor hydrochloride and 18 g. of calcium carbonate in 40 ml. of water and 80 ml. of chloroform. The mixture is subsequently stirred for 2 hours at 20°, filtered from undissolved material and the residue is rinsed with chloroform. The chloroform phase is washed with 1-N hydrochloric acid and water, dried over magnesium sulfate and evaporated under vacuum at 40°. D-Camphoryl-3-isothiocyanate, having a melting point of 104°–105°, is obtained from the residue by trituration with ice-cold petroleum ether.

4.4 g. of p-toluenesulfonamide sodium salt are dissolved with warming in 20 ml. of water, treated with a solution containing 4.8 g. of D-camphoryl-3-isothiocyanate in 40 ml. of acetone and heated to reflux for 2 hours. The acetone is removed by distillation under vacuum at 40°. The aqueous phase is extracted twice with ether and thereafter freed from residual ether under vacuum at 40°. The alkaline-reacting aqueous solution is precipitated by slow, dropwise addition to 5 percent acetic acid with stirring, filtered and again reprecipitated from 1-N caustic soda/5 percent acetic acid in the same way to yield 1-(p-toluenesulfonyl)-3-(3-endo-D-camphoryl)-thiourea as the crude product with a melting point of 104°–106°.

EXAMPLE 2

Preparation of 1-P-toluenesulfonyl)3-(3-endo-D-camphoryl)-urea 15 g. of 1-(p-toluenesulfonyl)-3-(3-endo-D-camphoryl)-iso-thiourea methyl ether are heated on a steam-bath for 2 hours in 50 ml. of dioxane and 40 ml. of 1-N caustic soda. The dioxane is removed by distillation under vacuum. The aqueous solution is diluted with 50 ml. of water and extracted with ethyl acetate. The ethyl acetate is removed from the alkaline, aqueous phase under vacuum. Upon the dropwise addition, with stirring, of the resulting solution to 5 percent acetic acid, reprecipitation from alcohol/water and recrystallization from alcohol, there is obtained 1-(p-toluenesulfonyl)-3-(3-endo-D-camphoryl)-urea having a melting point of 191°–193°.

The starting material can be prepared as follows:

20 g. of potassium p-toluenesulfonyliminodithiocarbonate, 200 ml. of alcohol and 18 ml. of methyl iodide are heated under a reflux condenser for 2 hours, filtered and evaporated in vacuum. The residue is dissolved in ethyl acetate, washed with water, dried over magnesium sulfate and evaporated under vacuum whereby p-toluenesulfonyliminodithiocarbonic acid dimethyl ester is obtained as a viscous oil which is used without further purification.

A solution containing 11 g. of p-toluenesulfonyliminodithiocarbonic acid dimethyl ester in 50 ml. of chloroform is added to a solution containing 9.2 g. of 3-endo-amino-D-camphor hydrochloride in 100 ml. of chloroform and 6.4 ml. of triethylamine and the mixture is heated under reflux for 3 hours. Thereafter, the solution is evaporated under vacuum. The residue is dissolved in ethyl acetate and water, washed with water, dried over magnesium sulfate and evaporated in vacuum whereby 1-(p-toluenesulfonyl)-3-(3endo-D-camphoryl)-isothiourea methyl ether is obtained as an oil.

EXAMPLE 3

Preparation of 1-(p-toluenesulfonyl)-3-(3-endo-D-camphoryl)-urea

A mixture of 2 g. of 3-endo-methoxycarbonylaminocamphor, 2 g. of p-toluenesulfonamide sodium and 2 ml. of dimethylformamide are heated on a water-bath for 15 hours. The reaction mixture is then decomposed with 100 ml. of ice-cold water and filtered. The filtrate is acidified with dilute hydrochloric acid. The precipitate is removed by filtration, suspended in 150 ml. of water and stirred at 80° for 2 minutes. While still warm, the precipitate is removed by filtration to yield 1-(p-toluenesulfonyl)-3-endo-D-camphoryl)-urea, identical with the product obtained in accordance with Examples 1 and 2.

The 3-endo-methoxycarbonylaminocamphor can be prepared as follows:

3 g. of 3-endo-D-amino-camphor hydrochloride are dissolved in 20 ml. of water. The solution is treated with 50 ml. of 10 percent soda solution and thereafter, dropwise at room temperature with 2 ml. of ethyl chloroformate. The mixture is stirred for 5 minutes, filtered, washed with water and dried to yield 3-endo-methoxycarbonylaminocamphor having a melting point of 113° after recrystallization from ether.

EXAMPLE 4

Preparation of 1-(p-toluenesulfonyl)-3-(3-endo-D-camphoryl)-urea 2.4 g. of O-methyl-N-p-toluenesulfonylisourea, 2.1 g. of 3-endo-D-aminocamphor hydrochloride and 2 ml. of dimethylformamide are heated on a water-bath for 6 hours. After cooling, the reaction mixture is stirred with 100 ml. of water and filtered. The residue, while still moist, is dissolved in ethyl acetate. The ethyl acetate solution is dried and evaporated under vacuum.

The residue is recrystallized from ethyl acetate. The mother liquor thereby obtained is evaporated and the residue thus obtained is recrystallized from alcohol/water to yield 1-(p-toluenesulfonyl)-3-(3-endo-D-camphoryl)-urea, identical with the product obtained according to the foregoing examples.

The O-methyl-N-p-toluenesulfonylisourea can be prepared as follows:

11 g. of O-methylisourea hydrochloride are dissolved in water and treated with an ice-cold solution containing 28 g. of potassium carbonate in 200 ml. of water. 19 g. of p-toluene-sulfonyl chloride in 500 ml. of chloroform are thereafter added. This mixture is stirred overnight. The chloroform phase is separated, washed with water, dried and evaporated. The residue is recrystallized from ethyl acetate to yield O-methyl-N-p-toluenesulfonyl-isourea having a melting point of 148°.

EXAMPLE 5

Preparation of 1-(p-toluenesulfonyl)-3-(2-endo-hydroxy-3-endo-bornyl)-urea 2.1 g. of 3-endoaminoborneol hydrochloride and 2.4g. of O-methyl-N-p-toluenesulfonyl-urea are heated at 125° for 3 hours with 2 ml. of dimethylformamide. After cooling, the reaction mixture is stirred with 100 ml. of water for 10 minutes, while a pH of 3.5 is maintained by the addition of a few drops of dilute hydrochloric acid. The precipitate is removed by filtration, washed with water and suspended in 100 ml. of water. The suspension is dissolved by the addition of 20 ml. of 1-N caustic soda. The alkaline solution is extracted with ether, acidified with dilute hydrochloric acid and filtered. The precipitate is washed with water and recrystallized from alcohol/water to yield 1-(p-toluenesulfonyl)-3-(2-endo-hydroxy-3-endo-bornyl)-urea having a melting point of 193°–195°.

EXAMPLE 6

Preparation of 1-(p-toluenesulfonyl)-3-(2-endo-hydroxy-3-endo-D-bornyl)-urea 0.3 g. of 2-(p-toluenesulfonylimino)-endo-D-bornano[3′,2′:4,5]oxazolidine are boiled for 90 minutes with 10 ml. of 2-N caustic soda. After cooling, the reaction mixture is treated with 80 ml. of ice-water and thereafter precipitated with cold dilute hydrochloric acid to yield 1-(p-toluenesulfonyl)-3-(2-endo-hydroxy-3-endo-D-bornyl)-urea having a melting point of 195°–198° (from alcohol/water).

The starting material can be prepared as follows:

2.3 g. of 3-endo-aminoborneol are boiled for 6 hours with 3.8 g. of p-toluenesulfonyliminodithiocarbonic acid dimethyl ester in 20 ml. of xylene. The reaction mixture is evaporated in vacuum and the residue crystallized from ether whereby 2-(p-toluenesulfonylimino)-endo-D-bornano[3′,2′:4,5]oxazolidine, melting point 175°–176° (from aqueous alcohol); $[\alpha]_D^{20} = 76°$ ($c = 10$ in chloroform), is obtained.

We claim:

1. A compound of the formula

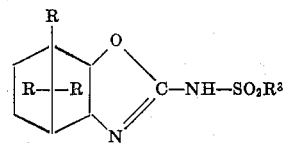

wherein R is hydrogen or methyl and $R^3$ is selected from the group consisting of phenyl; phenyl substituted by halogen, lower alkyl, lower alkoxy or lower alkylthio; beta-(2-methoxy-5-chloro-benzamido)-ethyl; pyrrolidino; or piperidino.

2. A compound in accordance with claim 1 wherein R is methyl.

3. A compound in accordance with claim 2 wherein $R^3$ is phenyl substituted by lower alkyl.

4. A compound in accordance with claim 3, 2-(p-toluene-sulfonylimino)-endo-D-bornano[3′,2′:4,5]oxazolidine.

* * * * *